US 8,682,905 B2

Mar. 25, 2014

(12) United States Patent
Basu et al.

(10) Patent No.: US 8,682,905 B2
(45) Date of Patent: Mar. 25, 2014

(54) ENTERPRISE DATA MATCHING

(71) Applicant: Clear Channel Management Services, Inc., San Antonio, TX (US)

(72) Inventors: Kohinoor Basu, Irvine, CA (US); Angel Barnachea Chua, Aliso Viejo, CA (US); Matthew M. Ferry, Lake Forest, CA (US); Scott Arthur Roberts, Irvine, CA (US)

(73) Assignee: Clear Channel Management Services, Inc., San Antonio, TX (US)

( * ) Notice: Subject to any disclaimer, the term of this patent is extended or adjusted under 35 U.S.C. 154(b) by 0 days.

(21) Appl. No.: 13/709,199

(22) Filed: Dec. 10, 2012

(65) Prior Publication Data
US 2013/0097160 A1 Apr. 18, 2013

Related U.S. Application Data

(63) Continuation of application No. 12/642,858, filed on Dec. 21, 2009, now Pat. No. 8,356,037.

(51) Int. Cl.
*G06Q 30/00* (2012.01)
(52) U.S. Cl.
USPC .......................... 707/748; 705/7.12; 705/14.4
(58) Field of Classification Search
None
See application file for complete search history.

(56) References Cited

U.S. PATENT DOCUMENTS

| 6,026,398 A | 2/2000 | Brown et al. |
| 6,035,307 A | 3/2000 | Martin et al. |
| 6,338,043 B1 | 1/2002 | Miller |
| 6,408,277 B1* | 6/2002 | Nelken ........................ 705/7.15 |
| 6,513,065 B1 | 1/2003 | Hafez et al. |
| 6,615,258 B1 | 9/2003 | Barry et al. |
| 6,718,551 B1 | 4/2004 | Swix et al. |
| 6,937,996 B1 | 8/2005 | Forsythe et al. |
| 7,403,942 B1 | 7/2008 | Batliss |
| 8,359,339 B2* | 1/2013 | Adams et al. ................. 707/805 |
| 8,423,514 B2* | 4/2013 | Goldenberg et al. ......... 707/673 |
| 2002/0065825 A1 | 5/2002 | Kassan et al. |
| 2003/0126102 A1 | 7/2003 | Borthwick |
| 2003/0126156 A1 | 7/2003 | Stoltenberg et al. |
| 2004/0162742 A1* | 8/2004 | Stoker et al. ....................... 705/7 |
| 2005/0091098 A1* | 4/2005 | Brodersen et al. ................ 705/8 |
| 2005/0137899 A1* | 6/2005 | Davies et al. .................... 705/1 |

(Continued)

OTHER PUBLICATIONS

Banjelloun et al, "Swoosh: a generic approach to entity resolution", VLDB Journal, 2009.

(Continued)

*Primary Examiner* — Daniel Kinsaul
(74) *Attorney, Agent, or Firm* — Garlick & Markison; Edward J. Marshall

(57) ABSTRACT

A system and method for managing media advertising enterprise data including a process for learning enterprise data matching. An EDM (Enterprise Data Management) application module can be configured to include a set of rules at an enterprise level to manage disparate and disconnected records associated with an entity. A number of unmatched and enterprise entities that matches with respect to an active entity can be returned based on a fuzzy logic associated with various matching options stored in an EDM database. A matching process can then be performed to accurately match similar records regardless of manual input, location, and format of the records in a distributed system. Each unmatched record can then be assigned with a parent enterprise entity. Such an optimization mechanism can interactively manage and report records at the enterprise level in a simple and efficient manner.

16 Claims, 11 Drawing Sheets

(56) References Cited

U.S. PATENT DOCUMENTS

| | | |
|---|---|---|
| 2006/0004595 A1* | 1/2006 | Rowland et al. .................. 705/1 |
| 2006/0178954 A1 | 8/2006 | Thukral et al. |
| 2007/0039018 A1* | 2/2007 | Saslow et al. .................. 725/22 |
| 2007/0162453 A1 | 7/2007 | Balogh |
| 2008/0189279 A1 | 8/2008 | Mayer et al. |
| 2008/0208735 A1* | 8/2008 | Balet et al. ...................... 705/39 |
| 2008/0235249 A1 | 9/2008 | Stephens et al. |
| 2008/0275733 A1 | 11/2008 | Schmidt et al. |
| 2009/0177542 A1 | 7/2009 | Haberman et al. |
| 2009/0198686 A1* | 8/2009 | Cushman et al. ................. 707/5 |
| 2009/0232294 A1* | 9/2009 | Xie et al. .................. 379/265.1 |
| 2009/0248521 A1 | 10/2009 | Arora |
| 2010/0058183 A1* | 3/2010 | Hamilton et al. ............. 715/706 |

OTHER PUBLICATIONS

Battacharya et al, "A Latent Dirichlet Model for Unsupervised Entity Resolution", University of Maryland CS Dept. Technical Report, 2005.

Verykios et al, "A Bayesian decision model for cost optimal record matching", VLDB Journal, 2003.

Borthwick et al, "Business Requirements of a Record Matching System", 9th International Conference on Information Quality, 2004.

\* cited by examiner

850

Enterprise Advertiser

| | | |
|---|---|---|
| Name | * | |
| Industry | * | Select One ▼ |
| Revenue | * | Select One ▼ |
| Phone | | |
| Address 1 | | |
| Address 2 | | |
| City | | |
| State | | Select One ▼ |
| Zip Code | | |
| Contact | | |
| Contact | | |

[ Ok ] [ Cancel ]

ENTERPRISE DATA MATCHING

CROSS-REFERENCE TO RELATED APPLICATIONS

This application claims priority pursuant to 35 U.S.C. §120, as a continuation, to the following U.S. Utility Patent Application which is hereby incorporated herein by reference in its entirety and made part of the present U.S. Utility Patent Application for all purposes:

U.S. Utility application Ser. No. 12/642,858, entitled "PROCESSES TO LEARN ENTERPRISE DATA MATCHING," filed Dec. 21, 2009, pending.

TECHNICAL FIELD

Embodiments are generally related to enterprise data-processing systems and methods. Embodiments also relate in general to the field of computers and similar technologies and, in particular, to software utilized in this field. In addition, embodiments relate to the management of advertising data.

BACKGROUND OF THE INVENTION

Advertising forms an important part of broadcast programming including broadcast video (e.g., television), radio, and printed media. Advertising management systems are distributed systems where local entities create and manage advertiser and agency content and records. Such systems often possess a large number of duplicate advertiser and agency records in their database(s). Integrating such distributed systems into an enterprise environment can create duplicate entries, compatibility issues, connection difficulties, redundancy issues, and other significant inefficiencies.

Many distributed and disconnected legacy systems utilized by media outlets typically include a large number of duplicate advertiser and agency records. One of the main problems associated with conventional techniques for managing such records is the lack of effective tools for scoring, evaluating, and comparing data with respect to a single enterprise. For example, consider a user belonging to a market associated with an enterprise that creates a new advertiser named 'Baja Fresh' and another user who belongs to another market associated with the same enterprise creates a new advertiser 'Baja Grill' with a slight variation in the name (i.e., "Baja"). Technically, both these advertiser names refer to the same master advertiser, which is 'Baja Fresh'. Hence, it is important to have a single instance of an advertiser and not multiple duplicates for management and reporting purposes. Another problem associated with conventional advertising techniques involves management and reporting of large amounts of data by local users, which is time consuming and inefficient.

Based on the foregoing, it is believed that a need exists for an improved system and method for managing media advertising enterprise data, as described in greater detail herein.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 9 illustrates a graphical user interface for inputting details associated with a new enterprise advertiser, in accordance with the disclosed embodiments;

FIG. 10 illustrates a graphical user interface that displays a number of enterprise entities, in accordance with the disclosed embodiments;

FIG. 11 illustrates a graphical user interface that displays user metrics associated with the entities, in accordance with the disclosed embodiments.

DETAILED DESCRIPTION

The particular values and configurations discussed in these non-limiting examples can be varied and are cited merely to illustrate at least one embodiment and are not intended to limit the scope thereof.

Figure 1:
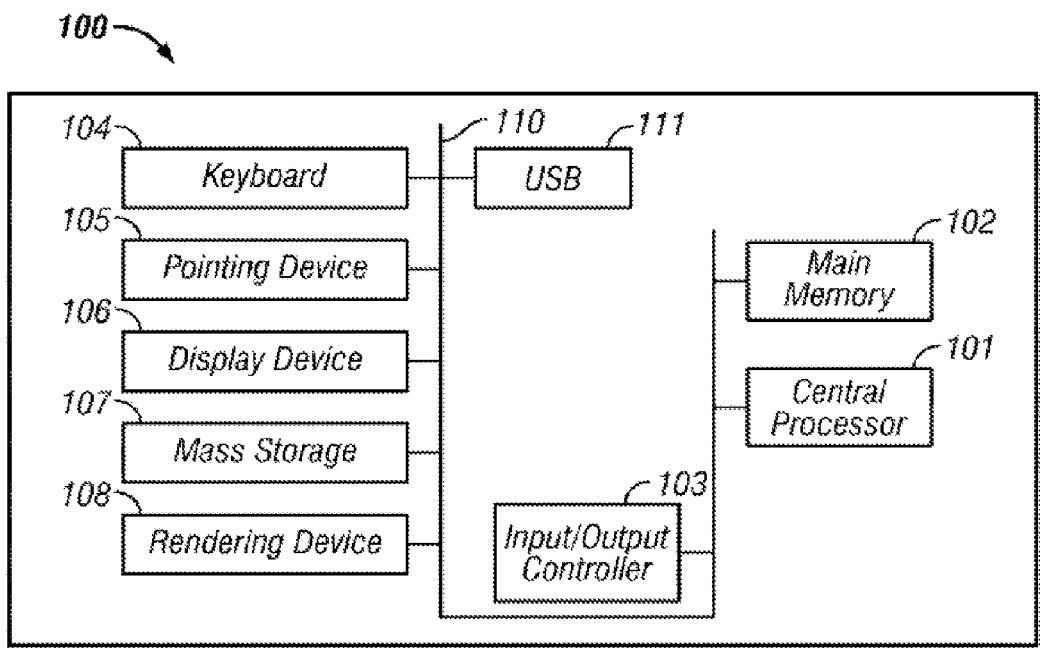
FIG. 1 illustrates a schematic view of a data-processing system in which an embodiment may be implemented.
Figure 2:
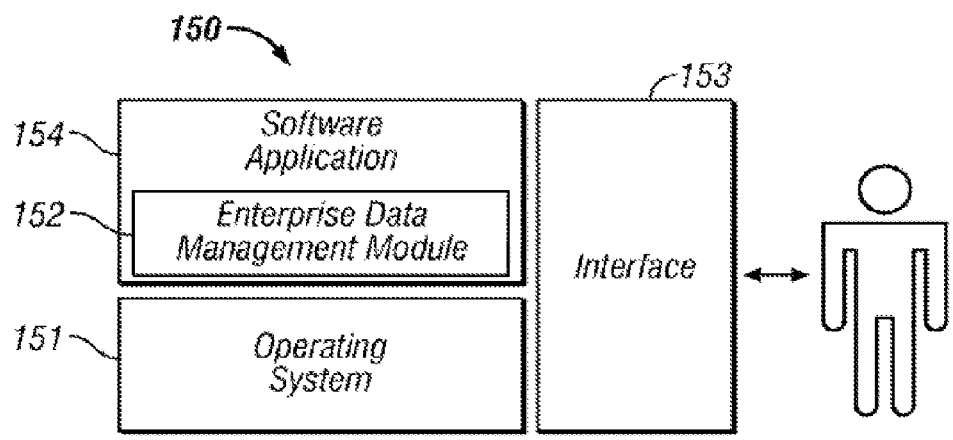
FIG. 2 illustrates a schematic view of a software system including an operating system, application software, and a user interface for carrying out an embodiment.
Figure 3:
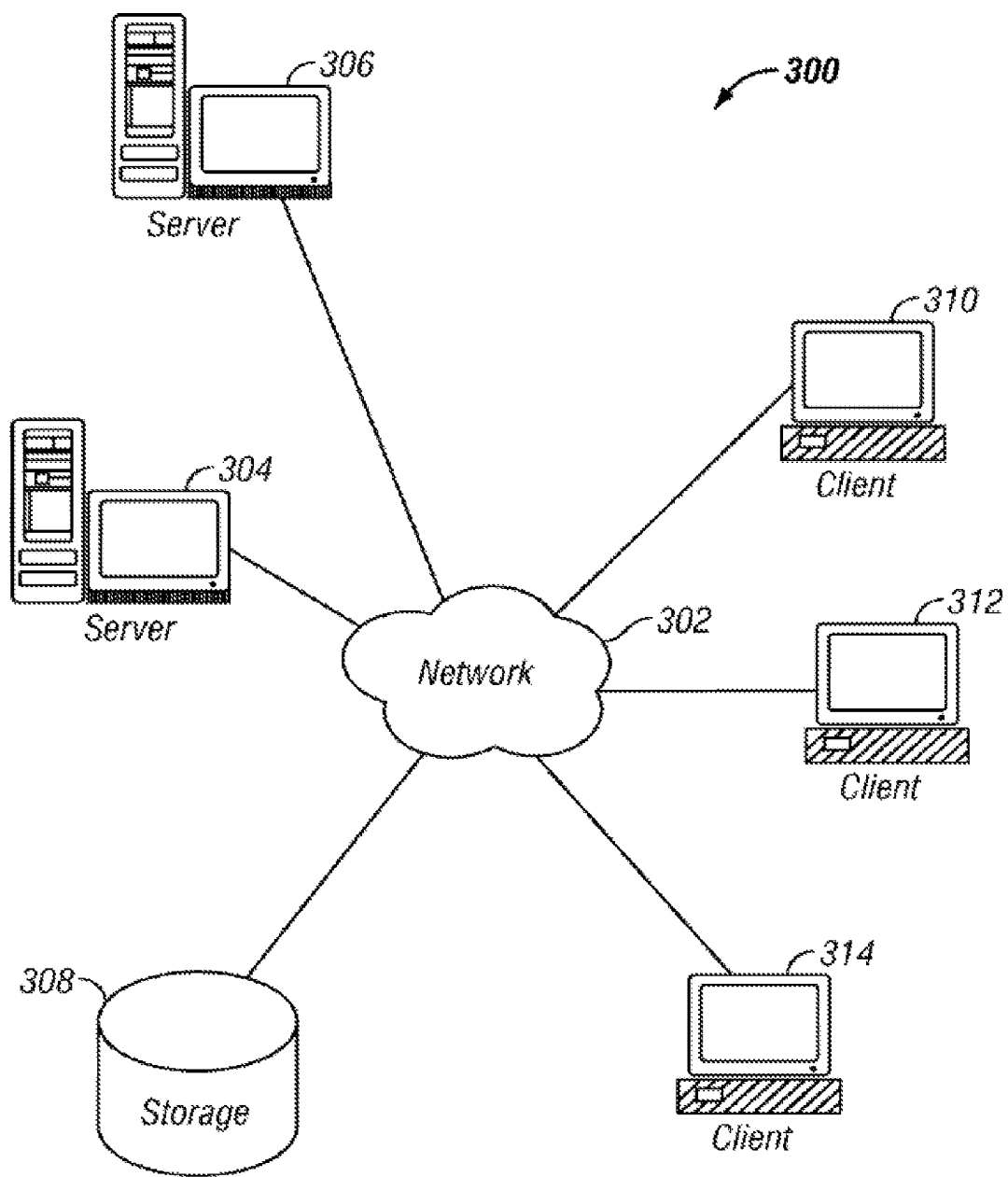
FIG. 3 illustrates a graphical representation of a network of data-processing systems in which aspects of the disclosed embodiments may be implemented.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 1, the disclosed embodiments may be implemented in the context of a data-processing system 100 that includes, for example, a central processor 101, a main memory 102, an input/output controller 103, a keyboard 104, an input device 105 (e.g., a pointing device, such as a mouse, track ball, pen device, etc), a display device 106, a mass storage 107 (e.g., a hard disk), and a USB (Universal Serial Bus) peripheral connection 111. Additional input/output devices, such as a rendering device 108 (e.g., printer, scanner, fax machine, etc), for example, may be associated with the data-processing system 100 as desired. As illustrated, the various components of data-processing system 100 can communicate electronically through a system bus 110 or similar architecture. The system bus 110 may be, for example, a subsystem that transfers data between, for example, computer components within data-processing system 100 or to and from other data-processing devices, components, computers, etc.

FIG. 2 illustrates a computer software system 150 for directing the operation of the data-processing system 100 depicted in FIG. 1. Software application 154, stored in main memory 102 and on mass storage 107, generally includes a kernel or operating system 151 and a shell or interface 153. One or more application programs, such as software application 154, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating system module 151 and/or software application 154.

The following discussion is intended to provide a brief, general description of suitable computing environments in which the system and method may be implemented. Although not required, the disclosed embodiments will be described in the general context of computer-executable instructions such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 153, which is preferably a graphical user interface (GUI), can serve to display results, whereupon a user may supply additional inputs or terminate a particular session. In some embodiments, operating system 151 and interface 153 can be implemented in the context of a "Windows" system. It can be appreciated, of course, that other types of operating systems and interfaces may be alternatively utilized. For example, rather than a traditional "Windows" system, other operation systems such as, for example, Linux may also be employed with respect to operating system 151 and interface 153. The software application 154 can include, for example, an EDM module 152 for managing media advertising enterprise data in a business management application. The EDM module 152 generally configures a set of rules at an enterprise level to manage disparate and disconnected records. EDM module 152 can include instructions such as those of method 500 and 700 respectively discussed herein with respect to FIG. 5 and FIG. 7.

FIG. 3 illustrates a graphical representation of a network of data-processing systems in which aspects of the disclosed embodiments may be implemented. Network data-processing system 300 is a network of computers in which embodiments of the present invention may be implemented. Network data-processing system 300 contains network 302, which is the medium used to provide communications links between various devices and computers connected together within network data-processing apparatus 300. Network 302 may include connections such as wire, wireless communication links, or fiber optic cables.

In the depicted example, server 304 and server 306 connect to and communicate with network 302 along with storage unit 308 (e.g. a memory, database, etc). In addition, clients 310, 312, and 314 connect to and communicate with network 302. These clients 310, 312, and 314 may be, for example, personal computers or network computers. Data-processing system 100 depicted in FIG. 1 can be, for example, a client such as client 310, 312, and/or 314. Alternatively, data-processing system 100 can be implemented as a server such as servers 304 and/or 306, depending upon design considerations.

In the depicted example, server 304 provides data such as boot files, operating system images, and applications to clients 310, 312, and 314. Clients 310, 312, and 314 are clients to server 304 in this example. Network data-processing system 300 may include additional servers, clients, and other devices not shown. Specifically, clients may connect to any member of a network of servers, which provide equivalent content.

In the depicted example, network data-processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages. Of course, network data-processing system 300 also may be implemented as a number of different types of networks such as, for example, an intranet, a local area network (LAN), or a wide area network (WAN).

FIGS. 1-3 are thus intended as an example and not as an architectural limitation with respect to particular embodiments. Such embodiments, however, are not limited to any particular application or any particular computing or data-processing environment. Instead, those skilled in the art will appreciate that the disclosed system and method may be advantageously applied to a variety of system and application software. Moreover, the present invention may be embodied on a variety of different computing platforms, including Macintosh, UNIX, LINUX, and the like.

Figure 4:
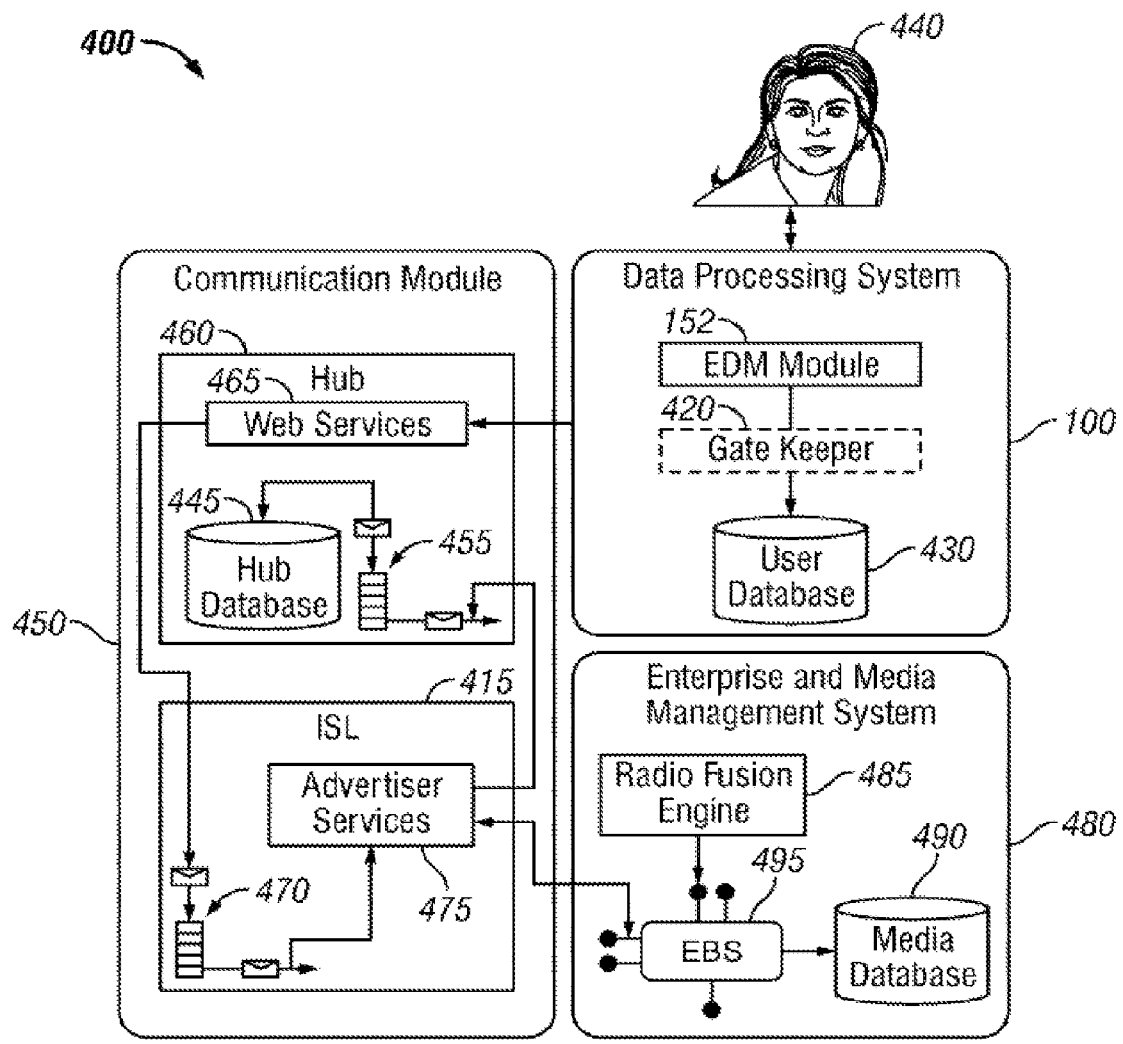
FIG. 4 illustrates a block diagram of a media advertising enterprise data management system, in accordance with the disclosed embodiments.

FIG. 4 illustrates a block diagram of a media advertising enterprise data management (EDM) system 400, in accordance with the disclosed embodiments. Note that in FIGS. 1-12, identical or similar blocks are generally indicated by identical reference numerals. The EDM system 400 matches a market entity to a central enterprise entity to permit consolidated reporting at an enterprise level. Note that the term "entity" refers generally to "advertiser" or "agency". The term entities can be used to describe situations that affect both the advertisers and agencies, for example, unmatched entities.

The EDM system 400 generally includes the data processing system 100, a communication module 450, and an enterprise and media management system 480. The data processing system 100 can provide access to a set of users 440 with respect to the enterprise and media management system 480. Data-processing system 100 depicted in FIG. 1 can be, for example, a server. Other devices such as, for example, desktops, network devices, palmtops, mobile phones, etc., may also be included in the enterprise data management system 400, as service providers.

The data-processing system 100 can be configured to include an EDM module 152 and a user database 430. The EDM module 152 can interact with and manage data in various enterprise and media applications and management solutions. The enterprise and media management system 480 can be, for example, VIERO®, transACT™, FUSION platforms that are trademarked and provided by Clear Channel to provide just-in-time advertising and extensibility services. The EDM module 152 can run under the credentials of the user logged operating system and utilize an integrated login in order to authenticate the user 440. Such a module can thus include instructions, which are stored in a computer memory and then retrieved and executed by, for example, a data-processing system such as, for example the system 100 depicted in FIG. 1.

The EDM module 152 can authenticate the user 440 by accessing a domain login and security privilege with respect to the user 440 that are locally stored in the user database 430. When the user 440 accesses the system 400, the EDM application 152 validates the domain login of the logged user with respect to the domain user name stored in the user database 430 via a gate keeper service 420 and checks if the user 440 is authorized to access the application 152. If the domain user name associated with the user 440 exists, the EDM module 152 validates and provides access to the required application.

The communication module 450 provides enterprise matching of distributed and disconnected entity records from user inputs. Such a process can accurately match the similar entity records regardless of the manual input, the location, and format of the records in the distributed system 480. The EDM module 152 includes a fuzzy logic in association with various matching options to match an active entity with respect to an unmatched entity and an enterprise entity. The system 400 organizes the disparate records utilizing a set of rules and a matching process to efficiently manage unorganized, un-useable records in the enterprise record set. The system 400 therefore provides a variety of capabilities for managing and reporting advertising records at the enterprise level. The process can start with an initial set of user inputs and adapt and learn behavior as users interact with the system 400.

The communication module 450 generally includes a hub 460 associated with a hub database 445, web services 465, and a hub queue 455. Note that the hub 460 can be a network hub or repeater hub for connecting multiple twisted pair or fiber optic Ethernet devices together and thus making them act as a single network segment. Hubs work at the physical layer (layer 1) of the OSI model. The device is thus a form of multiport repeater. Repeater hubs also participate in collision detection, forwarding a jam signal to all ports if it detects a collision.

The EDM module 152 interacts and manages data in the databases of instances associated with transACT™ and FUSION. The communication module 450 also includes an inter-switch link 415 that includes an inter-switch link queue 470 and an advertiser service 475. The media management system 480 associated with the EDM system 400 can include a radio fusion engine 485, a media database 490, and an enterprise bus service (EBS) 495. In general, fusion enabled entity can be stored into the radio fusion engine 485 and other entities can be stored in the advertiser services 475 associated with the communication module 450. A new advertiser/agency are required to be matched by the EDM module 152 and assigned a unique enterprise ID. Any key changes to the advertiser/agency records require that the record is re-matched and re-assigned and assigned a new Enterprise ID.

If a record to be re-matched is received from the advertiser service 475, the hub database 445 can check the advertiser ID or fusion ID associated with the record and update the name, revenue type, or industry code for the record. The changes with respect to the record can be automatically updated in the hub database 445 based on the advertiser ID/fusion ID and therefore when the user 440 logs into the EDM application 152 the changes can be visible. Additionally, when the advertiser service 475 transmits a record to be reassessed to the hub 460, it also transmits an 'Old Enterprise ID' in a response message which can be helpful for the user 440 to re-match the entity record. The proposals for advertisers/agents can be created in the radio fusion engine 485 for fusion enabled markets and, once the proposal becomes an order, the records associated with the advertiser/agent can be moved from the advertiser service 475.

The EDM module 152 can pull the records from the advertiser services 475 and the radio fusion engine 485 utilizing a windows service (DPEDM) at regular time intervals. The advertiser services 475 and the radio fusion engine 485 provide a response message that includes unmatched entity records with respect to the user request. The user 440 can further match the advertisers/agents with their respective enterprise entities and store the records into the media database 490 associated with the media management system 480. The media database 490 includes a 'tAdvertiser' and a 'tAgency' table that can be employed to store the advertiser and agent records individually. If a record exists in both fusion engine 485 and the advertiser service 475, then the scores of both records can be combined in order to ensure that each entity can possess a single score. All the retrieved records can be further prioritized based on the associated score in the media database 490. The records with the highest score can be provided the highest priority and assigned to a parent enterprise advertiser/agency.

Figure 5:
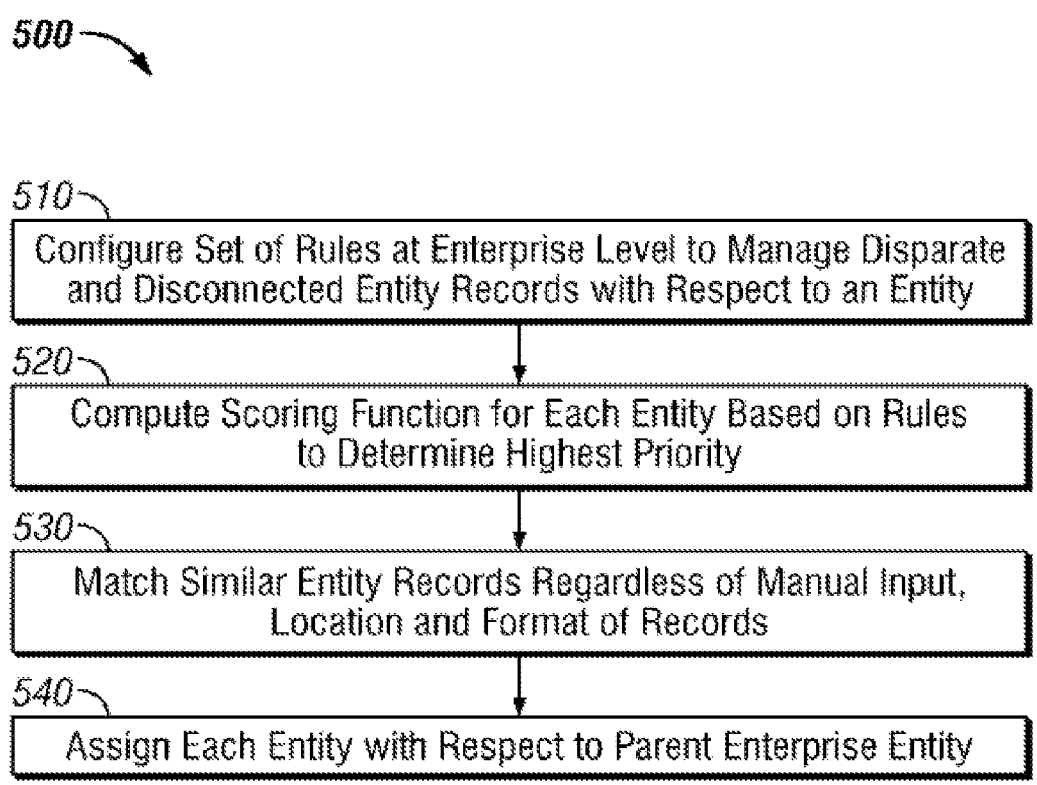
FIG. 5 illustrates a high-level flow chart of operations illustrating logical operational steps of a method for managing media advertising enterprise data, in accordance with the disclosed embodiments.

FIG. 5 illustrates a high-level flow chart of operations illustrating logical operational steps of a method 500 for managing media advertising enterprise data, in accordance with the disclosed embodiments. It can be appreciated that each of the steps or logical operations of the method 500 depicted in FIG. 5 can be implemented by executing a program instruction or a group of instructions in the data-processing system 100. The instructions depicted in FIG. 5 can be provided by, for example, a module or group of modules, as discussed earlier herein.

The EDM system 400 can be an automated system that selects the advertisers/agents to match and provides a list of possible matches. The user 440 can further make a final decision to match the advertiser/agency or to add it as a new enterprise advertiser/agency in the EDM system 400. Unmatched advertisers/agencies can be presented utilizing a ranking system that permits the user 440 to match advertisers with the highest revenue or market ranking. The system 400 can provide accurate reporting of advertiser records that is required for better management decisions and, therefore, enterprise advertiser information can be as reliable as possible.

A set of rules can be configured at an enterprise level to manage the disparate and disconnected market entity records, as depicted at block 510. A scoring function can be computed for each entity (advertiser/agency) associated with the EDM system 400 based on the rules in order to determine a highest priority, as illustrated at block 520. The similar entity records can be matched regardless of manual input location and format of the entity records, as indicated at block 530.

Thereafter, each entity can be assigned with respect to a parent enterprise entity, as illustrated at block 540. The method and system described herein can therefore provide an optimization mechanism for interactively managing and reporting market entity records at the enterprise level in a simple and efficient manner. The enterprise advertiser is the parent advertiser for identical advertisers in the markets. The advertiser can be created in the EDM system 400 and the like market advertisers can be linked to it. The enterprise advertisers order information from multiple markets can be consolidated for enterprise reporting once a link has been set up.

Figure 6:
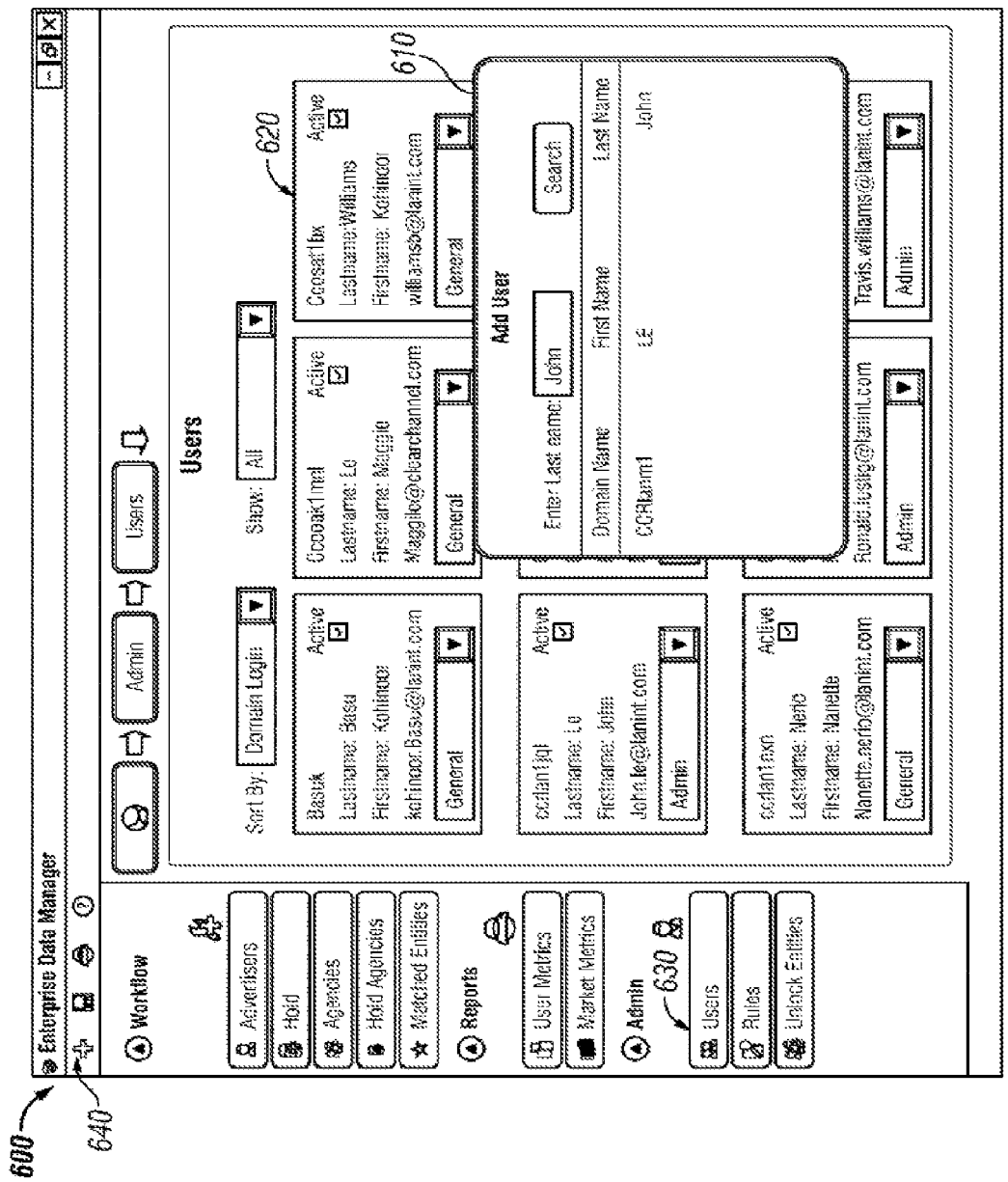
FIG. 6 illustrates a graphical user interface that displays user information associated with the EDM system, in accordance with the disclosed embodiments.

FIG. 6 illustrates a graphical user interface 600 that displays user information associated with the EDM system 400, in accordance with the disclosed embodiments. Note that the GUI 600, 800, 850, 900, 930 and/or 950 can be implemented utilizing a GUI such as, for example, the GUI 153 depicted in FIG. 2 herein, and may be provided by a module such as, for example, module 152 (i.e., a software application). GUI 600, 800, 850, 900, 930 and/or 950 can be displayed via a display device such as monitor 106 depicted in FIG. 1. In the illustrated figures herein, GUIs are generally implemented in the context of a GUI "window". Note that in computing, a GUI window is generally a visual area containing some type of user interface (e.g., GUI 153). Such a "window" usually (but not always) possesses a rectangular shape and displays the output of and may allow input to one or more processes. Such windows are primarily associated with graphical displays, where they can be manipulated with a mouse cursor such as, for example, the pointing device 105 depicted in FIG. 1. A GUI using windows as one of its main "metaphors" is often referred to as a windowing system.

An EDM administrator can access the GUI 600 to manage users and monitor activity. The GUI 600 can include functions such as, for example, to view existing EDM user information, add new users to access the EDM application, deactivate an active EDM user, and assign security privileges for each individual EDM user. The GUI 600 displays user cards such as a card 620 for all the existing EDM users in association with their details by accessing an icon 630. If the user "clicks" the icon 630, the GUI 600 provides information associated with the user. The user information can include, for example, domain login (usually with CCR followed by four digit code for the market and end with user's initials), first name, last name, email, role (admin or general), and active information. When displaying a user record, most information can be transferred from the user's employee record to the EDM module 152.

The employee information can be retrieved through the gatekeeper service 420 using a 'BulkGetUsers' web method. The 'BulkGetUsers' web method returns all the user records. EDM module 152 can run a daily process to acquire the data from the gatekeeper service 420 and store the data in the 'tUserSetting' table associated with the EDM user database 430. The active EDM users and their details can only be displayed on the GUI 600. If the user "clicks" the add icon 640, the GUI 600 displays a popup window 610 that permits an administrator to add new users. The 'add user' popup window 610 provides an option to search users by last name and add them to the list of active users that are authorized to use the EDM application 152. Once the user has been added to the list of active EDM users, they can be assigned a role such as admin or general in order to determine the level of access to the application.

Figure 7:
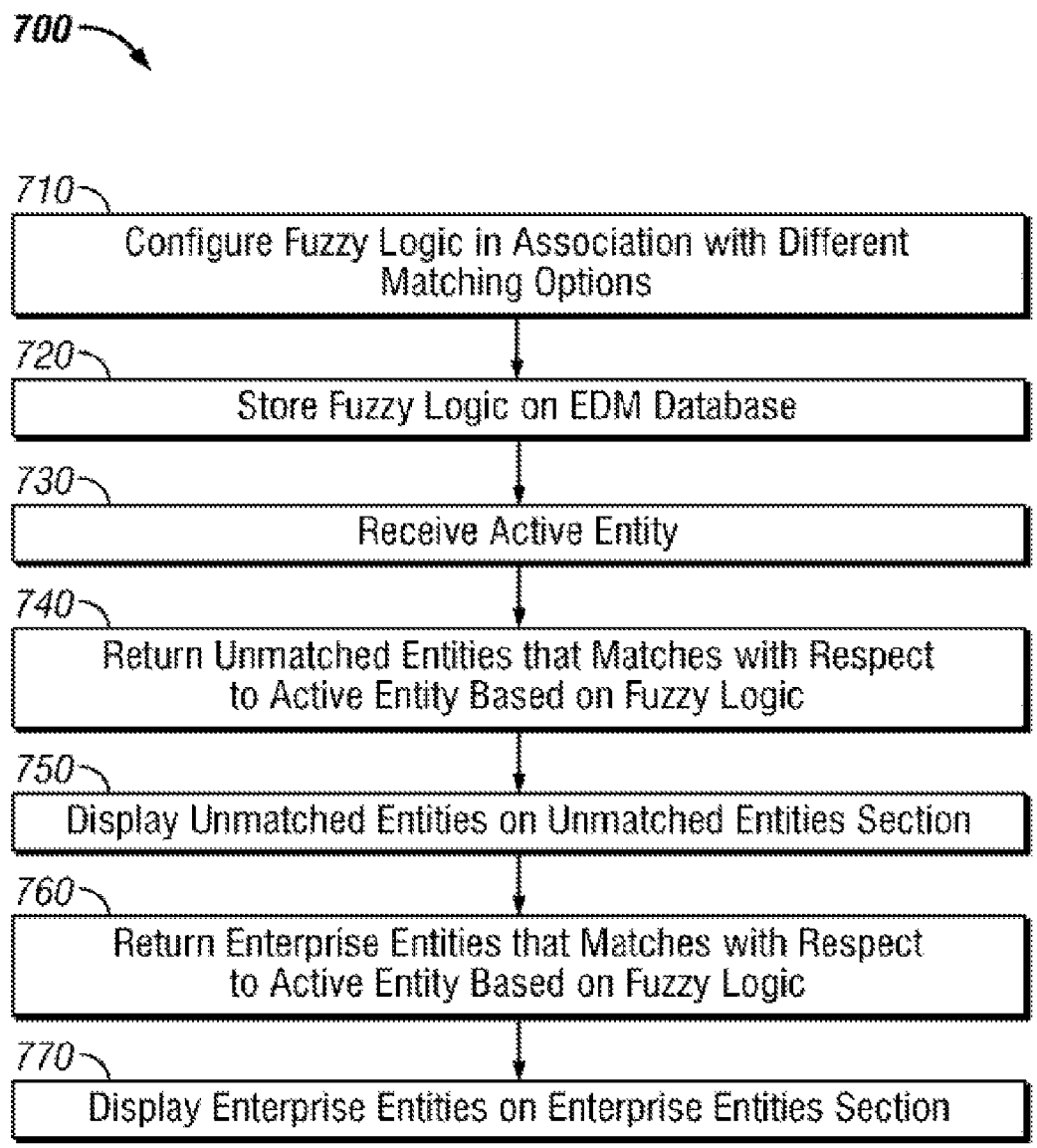
FIG. 7 illustrates a high-level flow chart of operations illustrating logical operational steps of a method for configuring a fuzzy logic in association with various matching options to match an active entity with respect to an unmatched entity and an enterprise entity, in accordance with the disclosed embodiments.

FIG. 7 illustrates a high-level flow chart of operations illustrating logical operational steps of a method 700 for configuring a fuzzy logic in association with various matching options to match an active entity with respect to an unmatched entity and an enterprise entity, in accordance with the disclosed embodiments. The EDM module 152 can be configured to include a set of rules at an enterprise level to manage disparate and disconnected records (e.g., advertiser/agency records). A scoring function with respect to each record can be computed based on the rules to determine the highest priority.

A fuzzy logic can be configured in association with varying matching options, as depicted at block 710. The fuzzy logic can be stored on the EDM database 430, as indicated at block 720. Thereafter, an active advertiser can be received, as illustrated at block 730. A number of unmatched advertisers that matches with respect to the active advertiser based on the fuzzy logic can be returned, as indicated at block 740. Thereafter, the unmatched advertisers can be displayed on an unmatched advertisers section 820, as indicated at block 750. Similarly, an enterprise advertiser that matches with respect to the active advertiser based on the fuzzy logic can be returned, as depicted at block 760. The enterprise advertisers can be displayed on an enterprise advertisers section 810, as illustrated at block 770.

The unmatched entity section 820 and the enterprise entity section 810 can be populated based on exact match, like match, and Soundex match options associated with the fuzzy logic. The exact match option, if chosen, provides that the unmatched entity or the enterprise entity name exactly matches the name of the active entity to qualify for matching. If an unmatched entity or the enterprise entity name exactly matches the name of an active entity, then it is an exact match. For example, if the 'current active unmatched advertiser=Auto maker company Y', then all the unmatched and enterprise advertisers that have exactly the same name as the active advertiser can be considered an exact match.

Like matches can include any words that exist in association with the active entity name. The unmatched and enterprise entities can be displayed in the following order such as, for example: exact matches; matches that starts, ends, or includes the first word of the active entity; matches that starts, ends, or includes the second word of the active entity; matches that starts, ends, or includes the third word of the active entity, and so on.

For example, if the "current active unmatched advertiser=Automaker X Automaker Y Automaker Z of Orange County", the like matches can return all advertisers that: begins with, ends with, and includes 'Automaker X'; begins with, ends with, and includes 'Automaker Y'; begins with, ends with, and includes 'Automaker Z'; begins with, ends with, and includes 'Orange', and begins with, ends with, and includes 'County'. The words included in TABLE 1 can be excluded when performing like matching. For instance, if the 'current active unmatched advertiser'='Auto Maker X, Automaker Y Automaker Z of Orange County', then like matching can exclude words that start, include, or end with 'of'.

TABLE 1

| I | in | who |
| a | is | will |
| about | it | with |
| an | inc | und |
| are | la | the |
| as | llc | www |

TABLE 1-continued

| at | n | Inc |
|---|---|---|
| be | of | LLC |
| by | on | |
| com | or | |
| de | that | |
| en | the | |
| for | this | |
| from | to | |
| how | was | |
| | what | |
| | when | |
| | where | |

Soundex is a data element search that employs an industry standard Soundex algorithm for indexing names by sound. The names with the same pronunciation can be encoded to the same representation so that they can be matched despite minor differences in spelling. Note that the Soundex matches cannot be performed, if the current active unmatched advertiser is a single letter name e.g., 'E'. The Soundex matches can be performed only for an unmatched entity and not for an enterprise entity. For example, if the 'current active unmatched advertiser=Soda maker Y Inc', Soundex matches can include advertiser names such as Soda Inc, computer essentials.

Figure 8:
FIG. 8 illustrates a graphical user interface that displays an unmatched entity section and an enterprise entity section, in accordance with the disclosed embodiment.

FIG. 8 illustrates a graphical user interface 800 that displays the unmatched entity section 820 and the enterprise entity section 810, in accordance with the disclosed embodiment. Note that the user interface as utilized herein generally refers to a type of environment that represents programs, files, options, and so forth by means of graphically displayed icons, menus, and dialog boxes on a screen. A user can interact with the user interface to select and activate such options by pointing and clicking with a user input device such as, for example, a touch screen, a keyboard, or the like. A particular item can function in the same manner to the user in all applications because the user interface provides standard software routines to handle these elements and reports the user's actions.

The active entity is an entity in the 'tAdvertiser' or 'tAgency' table stored in the database 430, which possess the highest score and has not been assigned to any user. The system 400 automatically populates the active entity section 810 with a brand new entity which has the highest score the very first time the EDM user 440 navigates to the advertiser screen 800. The user 440 may choose to continue working on the active entity until they decide to acquire the next active entity. If the user 440 is currently working on one active entity, then each time the user re-navigates to the entity screen, then the active entity can be automatically populated with the same active entity.

The enterprise entity section 810 displays all the enterprise entities from the table that are exact, like, and fuzzy matches to the active entity. The information such as, for example, name, industry, revenue type, enterprise ID, phone, address 1, address 2, city, state, zip code, contact, and contact phone can be displayed for each of the enterprise entity records. The records can be prioritized in alphabetic order if there are one or more entity records with the same score. Prioritization ensures that the most important entities can be considered first while assigning them to the user.

The unmatched entity section 820 displays all the unmatched entities that are either exact or fuzzy matches to the active entity from the TABLE. The numbers of unmatched entities that are displayed can be configured to be 100. The first record in the section 820 can be the active entity record which can be bolded to differentiate it from the other records. The exact and fuzzy matching can be solely based on the unmatched entity name. If there is more than one exact match, then the records can be sorted in descending order of score. Similarly, if there is more than one fuzzy match, then those records can also be sorted in descending order of score. The active entity and all the similar matches returned by the fuzzy logic can be locked for the specific user. The information can be displayed for each unmatched entity records, can be, for example, name, market, industry, revenue type, revenue ($), phone, address 1, address 2, city, state, zip code, contact, contact phone, and old enterprise entity. The old enterprise entity can be displayed if the entity is previously matched and some key information for an entity changed.

FIG. 9 illustrates a graphical user interface 850 for entering details associated with a new enterprise entity, in accordance with the disclosed embodiment. If the user "clicks" a create icon 830 in the GUI 800, a brand new enterprise entity that does not exist in the EDM database 430 can be created. When the create icon/button 830 is clicked, a popup window 850 can be displayed which permits the user to manually enter the details such as, for example, name, address, industry, revenue type, etc., associated with the new enterprise entity to be created. The name, industry, and revenue type are mandatory fields. An option can also be provided to create a new advertiser by typing in all the details manually or choose to select one of the unmatched advertisers that possess similar details as that of the enterprise entity that needs to be created.

Figure 10:
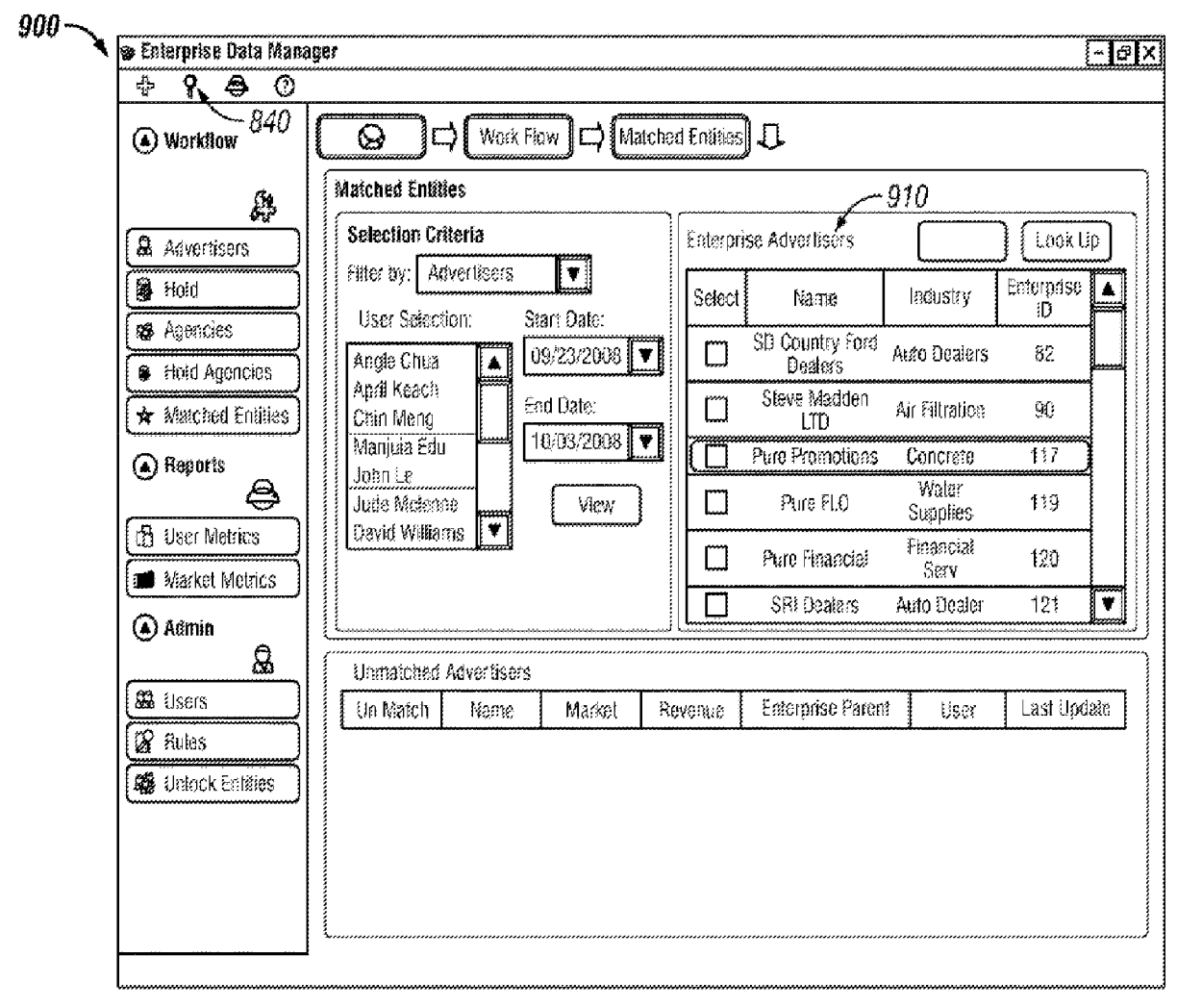

FIG. 10 illustrates a graphical user interface 900 that displays a number of enterprise entities, in accordance with the disclosed embodiments. The enterprise entity that is an exact match to an active entity can be selected/highlighted by default. The user 440 can select an enterprise entity from a displayed list 910 and that can be the parent enterprise entity to which all the similar (unmatched) entities can be matched. The user 440 has the option to select only one enterprise entity at any point in time. If the user is unable to find an enterprise entity in the list, then the user 440 can click a 'search' icon 840 in the toolbar associated with the GUI 900 to search for the required enterprise entity and one enterprise entity can be selected from the search results. The selected enterprise entity gets appended to the enterprise entity section 810 and this record can be selected/highlighted. Similarly, the newly created enterprise entity gets appended to the enterprise entity section and the record can be selected/highlighted.

Figure 11:
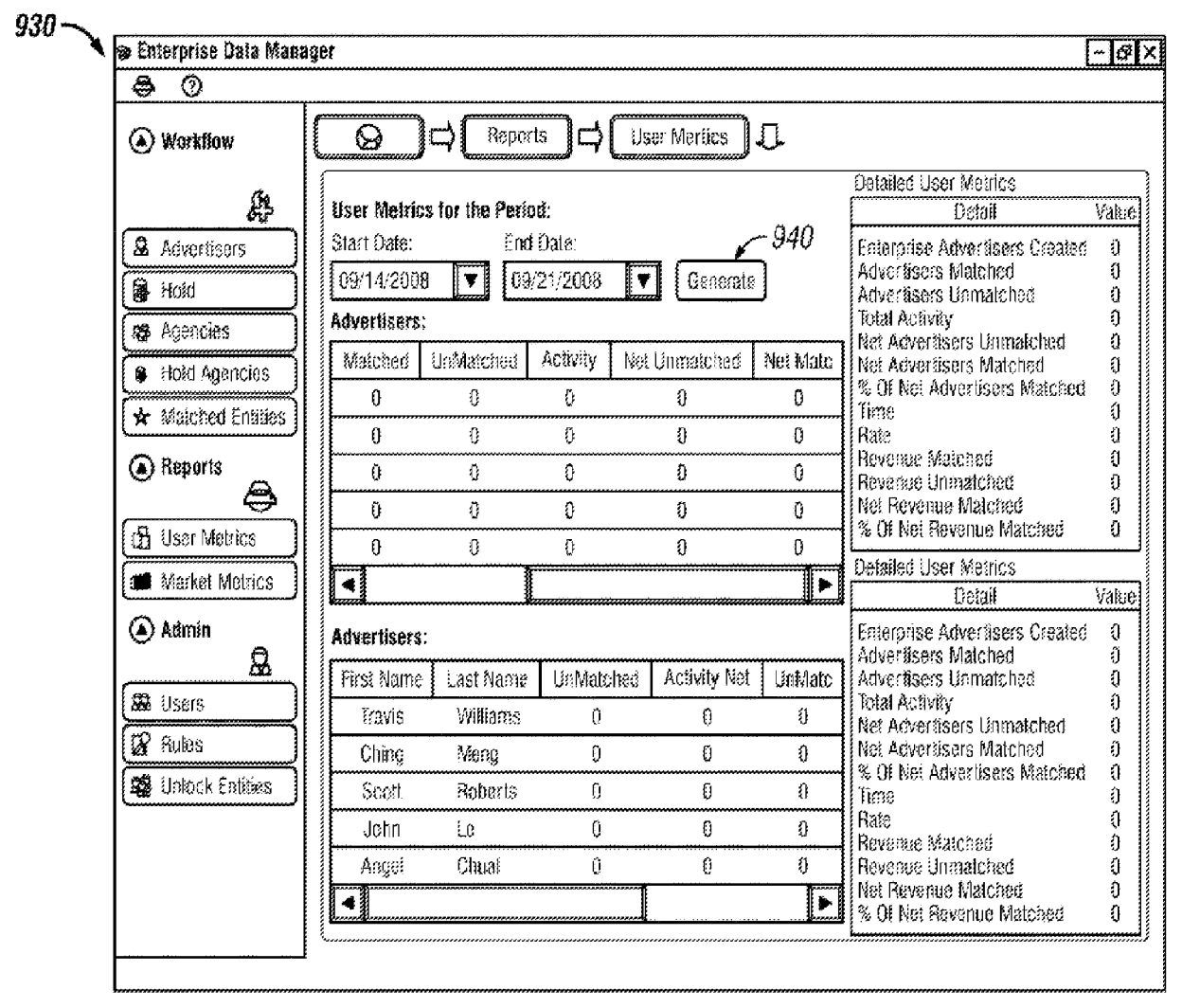

FIG. 11 illustrates a graphical user interface 930 that displays user metrics associated with the entities, in accordance with the disclosed embodiments. An administrator can generate reports for user metrics for a certain period of time. The user metrics 930 can be generated for both advertisers and agencies on the same screen. The user metrics 930 can be computed and displayed for each active EDM user including the administrator. The report can be generated by providing a start and end date. If the user "clicks" the generate icon 940 in the GUI 930, the data for the requested start and end dates can be generated.

Figure 12:
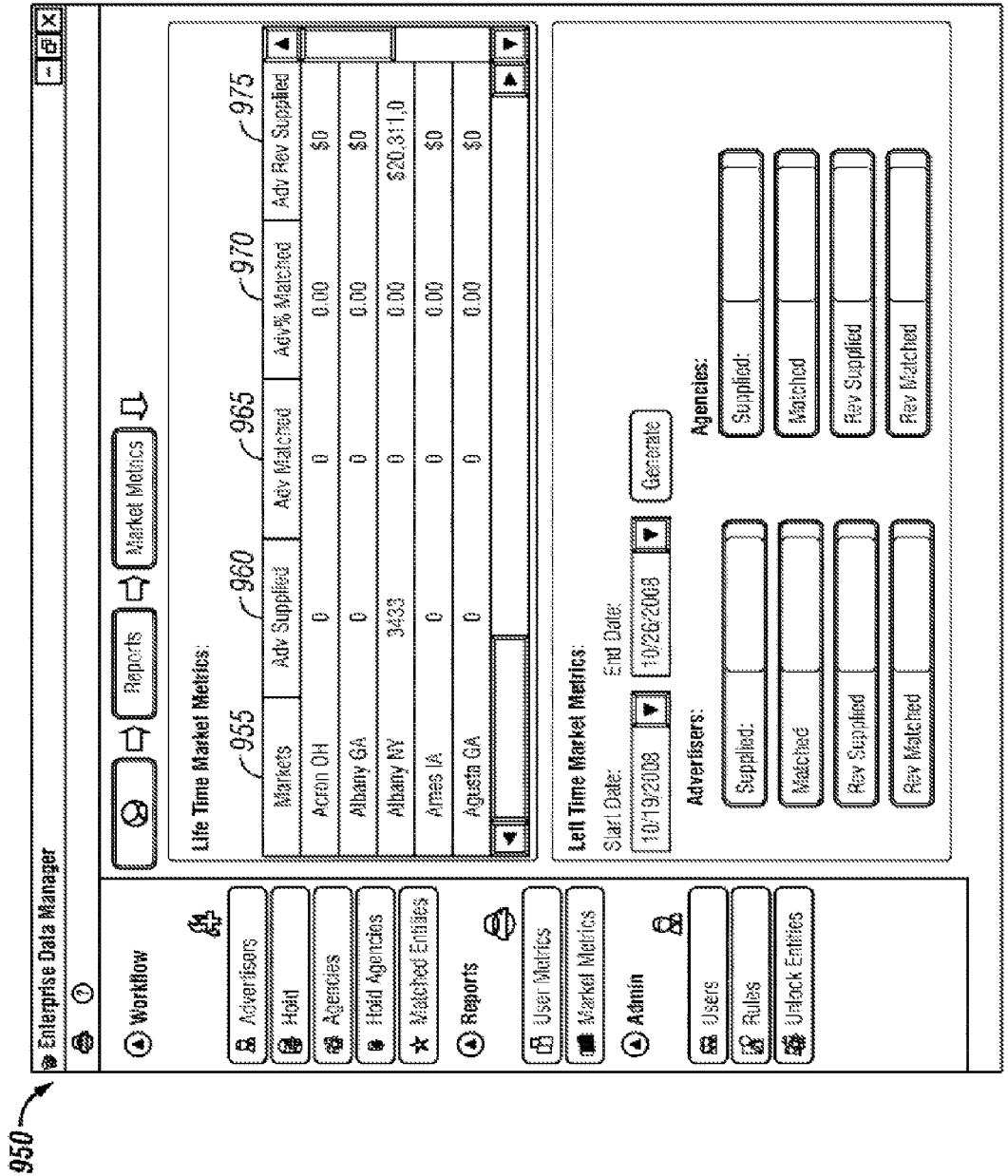
FIG. 12 illustrates a graphical user interface that displays life time metrics associated with the entities, in accordance with the disclosed embodiments.

FIG. 12 illustrates a graphical user interface 950 that displays life time metrics associated with the entities, in accordance with the disclosed embodiments. The lifetime metrics can be calculated for the life of the EDM module 152. The metrics can be calculated for all the markets in the table associated with the hub database 445. A markets column 955 displays a list of markets from the table in alphabetical order. The first market can be selected/highlighted by default. An "Adv Supplied metrics" column 960 indicates a total number of advertisers/agencies supplied for a market during the lifetime of the EDM module 152. An "Adv Matched" column 965 indicates the total number of advertisers/agencies matched for a market during the lifetime of the EDM module 152. If a record is matched and unmatched several times, then the final status can be evaluated. If the last status for an advertiser is 'matched', then it can be included in the matched count. If the last status for an advertiser is 'unmatched', then it cannot be included in the matched count. An "Adv % Matched" column 970 can be calculated, as shown in equation (1).

$$(\text{Matched}/\text{Supplied}) * 100 \quad (1)$$

An "Adv Rev Supplied" column 975 indicates total revenue associated to all advertisers/agencies supplied for a market during the lifetime of the EDM module 152. The "Adv Rev Matched" indicates revenue associated to 'Matched'. The "Adv % Rev Matched" can be calculated, as shown in equation (2).

$$(\text{Revenue Matched}/\text{Revenue Supplied}) * 100 \quad (2)$$

The user interface 600, 800, 850, 900, 930 and/or 950 in association with the EDM module 152, can provide a unique and innovative technique for storing, retrieving, and manipulating data from existing databases containing media-related data. By utilizing such a database with a simplified storage and retrieval protocol, the data contained therein can be effectively manipulated in real time. The disclosed user interface provides access to both the EDM application and the optimization mechanism in a simple and straightforward manner, significantly reducing training time. The EDM module 152 can provide a team of users with the ability to match duplicate advertiser and agency records to one master record. The system 400 provides a seamless path for "isolated" or distributed media records to integrate into a common ad management and display.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. An enterprise data management (EDM) system comprising:
   a systems integration engine configured to store a portion of a plurality of unmatched records associated with entities enabled to integrate with the systems integration engine;
   at least one module configured to provide a plurality of unmatched records, each individual record of the plurality of unmatched records is associated with a separate market entity of a plurality of market entities, each of the plurality of market entities is one of an advertiser and an agency, the at least one module comprising:
      a repeater hub configured to connect a plurality of devices to act as a single network segment and participate in collision detection;
      an inter-switch link that includes an advertiser service configured to store unmatched records associated with market entities not enabled to integrate with the systems integration engine;
   a data processing system configured to manage the plurality of unmatched records, managing the plurality of unmatched records includes scoring each of the plurality of unmatched records, by:
      computing a scoring function, based on a set of rules, to assign a individual rank to each individual record based on one of revenue and market ranking associated with the separate market entity,
      selecting a highest-ranking market entity from the plurality of market entities as the active entity,
      performing a first matching process, using a plurality of matching options, to match the active entity to at least one of a remaining plurality of market entities, and
      performing a second matching process, using the plurality of matching options, to match the active entity to a parent advertiser;
   a media database configured to store records associated with the active entity, the at least one of a remaining plurality of market entities, and the parent advertiser; and
   the systems integration engine configured to store a portion of the plurality of unmatched records associated with fusion enabled entities.

2. The EDM system of claim 1, the repeater hub further comprising a hub database configured to:
   check an identifier associated with each individual record of the plurality of unmatched records; and
   update each individual record based on the associated identifier.

3. The EDM system of claim 2, the data processing system further configured to receive the plurality of unmatched records from the advertiser service and the systems integration engine utilizing a windows service at regular time intervals.

4. The EDM system of claim 1, the data processing system further configured to manage the plurality of unmatched records by receiving the plurality of unmatched records from the advertiser service and the systems integration engine.

5. The EDM system of claim 1, scoring each of the plurality of unmatched records includes responding to a determination that instances of one of the plurality of unmatched records are stored by both the systems integration engine and the advertiser service by combining scores associated with each of the instances to ensure that each instance of the record is associated with a common score.

6. An enterprise data management (EDM) system comprising:
   a systems integration engine configured to store a portion of a plurality of unmatched records associated with entities enabled to integrate with the systems integration engine;
   at least one module configured to provide a plurality of unmatched records, each individual record of the plurality of unmatched records is associated with a separate market entity of a plurality of market entities, each of the plurality of market entities is one of an advertiser and an agency;
   an inter-switch link that includes an advertiser service configured to store unmatched records associated with market entities not enabled to integrate with the systems integration engine;
   a data processing system configured to manage the plurality of unmatched records, managing the plurality of unmatched records includes scoring each of the plurality of unmatched records, by:
      computing a scoring function, based on a set of rules, to assign a individual rank to each individual record based on one of revenue and market ranking associated with the separate market entity,
      selecting a highest-ranking market entity from the plurality of market entities as the active entity,
      using a plurality of matching options to match the active entity to a parent advertiser in order to manage and report records associated with the active entity;

a media database configured to store records associated with the active entity and the parent advertiser.

7. The EDM system of claim 6, the data processing system further configured to manage the plurality of unmatched records by providing information associated with the active entity and the parent entity to a user via a user interface.

8. The EDM system of claim 6, the repeater hub further comprising a hub database configured to:
  check an identifier associated with each individual record of the plurality of unmatched records; and
  update changes with respect to each individual record based on the associated identifier.

9. The EDM system of claim 8, the data processing system further configured to manage the plurality of unmatched records by receiving the plurality of unmatched records from the advertiser service and the systems integration engine.

10. The EDM system of claim 9, the data processing system further configured to receive the plurality of unmatched records from the advertiser service and the systems integration engine utilizing a windows service at regular time intervals.

11. The EDM system of claim 8, scoring each of the plurality of unmatched records includes responding to a determination that instances of one of the plurality of unmatched records are stored by both the systems integration engine and the advertiser service by combining scores associated with each of the instances to ensure that each instance of the record is associated with a common score.

12. An enterprise data management (EDM) system comprising:
  a systems integration engine configured to store a portion of a plurality of unmatched records associated with entities enabled to integrate with the systems integration engine;
  at least one module configured to provide a plurality of unmatched records, each individual record of the plurality of unmatched records is associated with a separate market entity of a plurality of market entities, each of the plurality of market entities is one of an advertiser and an agency;
  a repeater hub configured to connect a plurality of devices to act as a single network segment and participate in collision detection;
  an inter-switch link that includes an advertiser service configured to store unmatched records associated with market entities not enabled to integrate with the systems integration engine;
  a data processing system configured to manage the plurality of unmatched records based on input from a user, managing the plurality of unmatched records includes scoring each of the plurality of unmatched records, by:
    computing a scoring function, based on a set of rules, to assign a individual rank to each individual record based on one of revenue and market ranking associated with the separate market entity,
    selecting a highest-ranking market entity from the plurality of market entities as the active entity,
    using a plurality of matching options to match the active entity to at least one of a remaining plurality of market entities; and
  a media database configured to store records associated with the active entity and the at least one of a remaining plurality of market entities.

13. The EDM system of claim 12, the repeater hub further comprising a hub database configured to:
  check an identifier associated with each individual record of the plurality of unmatched records; and
  update changes with respect to each individual record based on the associated identifier.

14. The EDM system of claim 13, the data processing system further configured to manage the plurality of unmatched records by receiving the plurality of unmatched records from the advertiser service and the systems integration engine.

15. The EDM system of claim 14, the data processing system further configured to receive the plurality of unmatched records from the advertiser service and the systems integration engine utilizing a windows service at regular time intervals.

16. The EDM system of claim 14, scoring each of the plurality of unmatched records includes responding to a determination that instances of one of the plurality of unmatched records are stored by both the systems integration engine and the advertiser service by combining scores associated with each of the instances to ensure that each instance of the record is associated with a common score.

* * * * *